United States Patent [19]

Singh et al.

[11] Patent Number: 4,527,946
[45] Date of Patent: Jul. 9, 1985

[54] TIRE CURING PRESS WITH POP-UP, ROTATING NOZZLE

[75] Inventors: Anand P. Singh, Youngstown; Virgil Y. Blosser, Canfield; Thomas A. Crumbacher, Columbiana, all of Ohio

[73] Assignee: NRM Corporation, Akron, Ohio

[21] Appl. No.: 573,007

[22] Filed: Jan. 23, 1984

Related U.S. Application Data

[63] Continuation-in-part of Ser. No. 424,411, Sep. 29, 1982, abandoned.

[51] Int. Cl.³ .............................................. B29H 5/02
[52] U.S. Cl. ...................................... 425/42; 425/33; 425/36; 425/50; 425/58
[58] Field of Search ...................... 425/32, 33, 40, 43, 425/49, 50, 58

[56] References Cited

U.S. PATENT DOCUMENTS

| | | | |
|---|---|---|---|
| 2,736,059 | 2/1956 | Frank | 425/33 |
| 2,997,740 | 8/1961 | Soderquist | 425/32 |
| 3,170,011 | 2/1965 | Cheney et al. | 264/564 |
| 3,443,280 | 5/1969 | Hugger | 18/17 |
| 3,632,712 | 1/1972 | Miller | 425/40 X |
| 3,887,313 | 6/1975 | Jaedicke et al. | 425/33 X |
| 4,029,447 | 6/1977 | MacMillan | 425/33 X |
| 4,029,449 | 6/1977 | Longaberger | 425/36 X |
| 4,140,447 | 2/1979 | Bosnakovic | 425/43 |

FOREIGN PATENT DOCUMENTS 1210880 11/1970 United Kingdom ................. 425/43

Primary Examiner—J. Howard Flint, Jr.
Attorney, Agent, or Firm—Maky, Renner, Otto & Boisselle

[57] ABSTRACT

A pop-up, rotating nozzle in a tire curing press provides for dispersed and uniform introduction of fluid media into the upper containment portion of a curing and shaping bladder during tire cure and cooling, and yet allows for relatively close spacing of upper and lower bladder clamps such as during bladder insertion and stripping operations. The nozzle has an outlet head in communication with the interior of the bladder and a supply stem mounted in a lower bladder clamp and porting assembly of the press for both axial and rotational movement. The nozzle is movable against a spring biasing force by the upper bladder clamp to a lowermost retracted position which allows the bladder clamps to be axially spaced apart a distance substantially less than their axial spacing during cure. As the bladder clamps move apart to their respective positions for cure, the spring urges the nozzle to an elevated dispensing position locating the outlet head thereof in the upper containment portion of the bladder and closely adjacent the upper bladder clamp for more uniform circulation of fluid media with the drain located at the bottom of the bladder. The outlet head is provided with a plurality of tangentially arranged outlets or jets such that the nozzle will rotate causing a uniform and dispersed flow of fluid media throughout the interior of the bladder. The outlet head may also serve to locate the bladder clamps with respect to one another when engaged therebetween.

35 Claims, 7 Drawing Figures

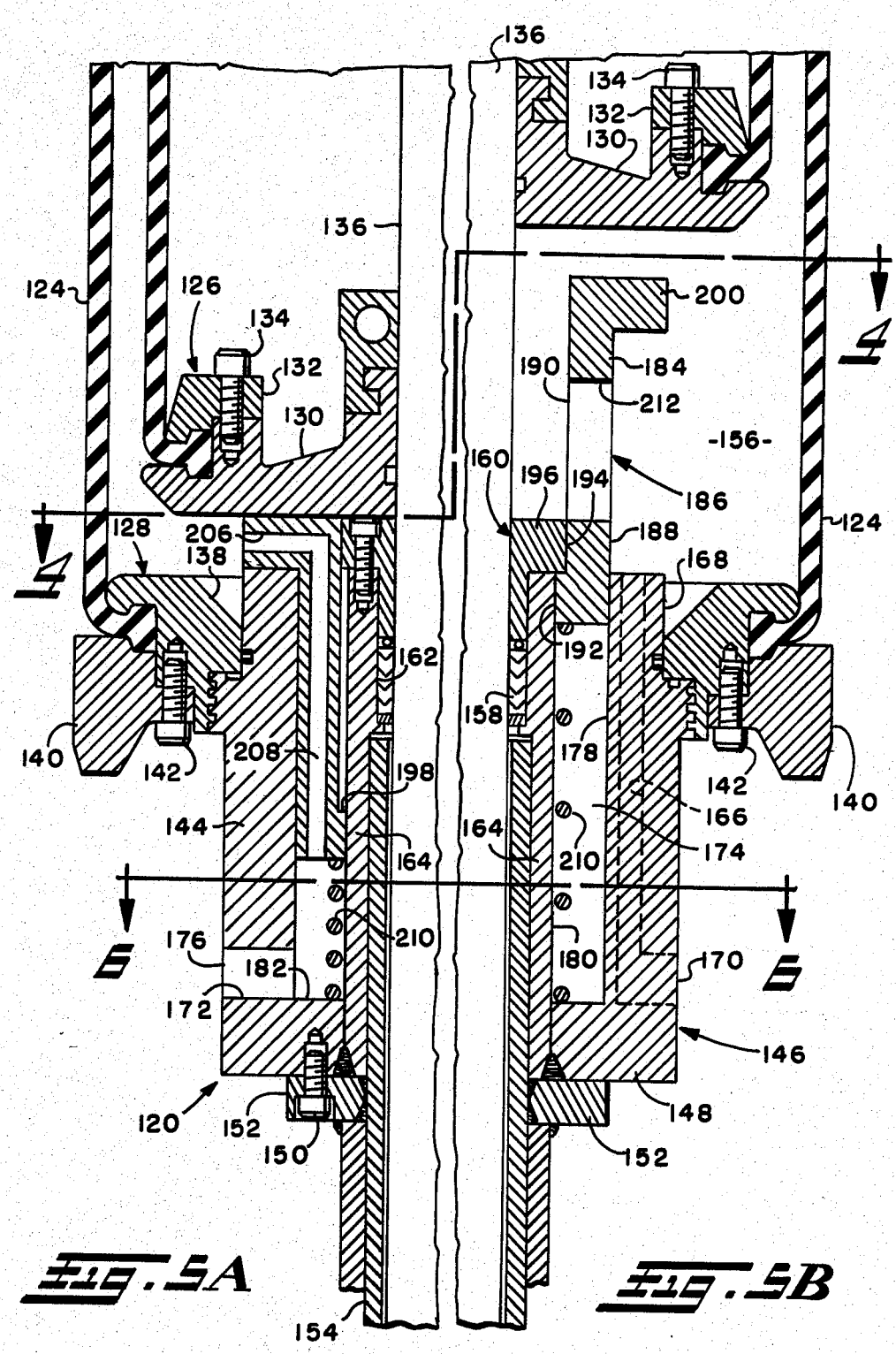
_Fig. 5A_   _Fig. 5B_

TIRE CURING PRESS WITH POP-UP, ROTATING NOZZLE

This application is a continuation-in-part of application Ser. No. 424,411, filed Sept. 29, 1982, now abandoned.

This invention relates generally to a tire curing press and, more particularly, to components thereof which provide for the introduction and circulation of heat transfer pressure media employed to shape and vulcanize a tire in the tire curing press.

BACKGROUND

In the conventional practice of shaping and curing a tire in a tire curing press, an uncured or green tire carcass is placed between separable mold sections which, when closed, define a tire shaped mold cavity. With the tire carcass in position, the press sections are closed and fluid media is introduced into the tire cavity under pressure to conform the tire carcass to the interior contour of the mold cavity. Most commonly, the fluid media is contained within a chamber defined by an inflatable curing and shaping bladder that is capable of being radially and axially distended by fluid media pressure into the tire cavity in order to apply shaping pressure against the interior surface of the tire carcass. Initially, hot fluid media is circulated through the bladder chamber whereby the tire carcass is cured by heat transferred from the fluid media and also by heat received from the exteriorly heated mold sections. After the requisite time period necessary to achieve vulcanization, a cold fluid media may be circulated through the bladder chamber to prevent overcure of the tire and to ready the tire for post-cure operations such as post-cure inflation. Thereafter, the cold fluid media is removed from the bladder chamber, the bladder is stripped from the tire and the tire is removed from the press. Most commonly, steam is employed as the hot fluid media and cold water as the cold fluid media.

In presses of the foregoing type, dispersed and uniform circulation of the fluid media within the bladder chamber or tire cavity is desirable to provide for uniform heat transfer to and from all areas of the tire carcass. Various attempts have been made to provide for uniform heat distribution by causing the fluid media to swirl through the bladder chamber. In the press apparatus disclosed in U.S. Pat. No. 3,443,280, for example, the lower bladder clamp and porting assembly thereof is provided with a centrally disposed spray or nozzle ring which has a plurality of circumferential ly arranged, downwardly angled nozzles or outlets. In U.S. Pat. No. 3,887,313, another form of nozzle ring is shown, but the nozzles thereof are tangentially arranged about the periphery of the ring.

For various reasons, it also is desirable that the fluid media be introduced into the upper center portion of the bladder chamber or tire cavity. This provides for better and more efficient circulation being that the drain for the fluid media is desirably located near the bottom of the bladder or tire cavity. In addition, this would avoid bubbling of hot curing media through a volume of cold fluid media that may possibly collect in the bottom of the bladder chamber, such collected cold fluid media being that which may be purged from the fluid media supply line at the start of a new curing cycle or which otherwise possibly may be left from the previous press cycle. Needless to say, such bubbling of hot through cold fluid media is energy inefficient. It also would be desirable to provide some means for driving out of the bladder chamber any vapors or gases while the media is introduced through the bottom port.

Unfortunately, mounting of a spray or nozzle device so that fluid media outlets thereof reside in the upper center portion of the bladder chamber during cure and cooling may be precluded by other functional and structural requirements of the tire press. In presses employing upstanding bladder center mechanisms, for example, the upper and lower bladder clamps of such center mechanisms may be required to be manipulated to a relatively close axial spacing such as during bladder insertion and stripping operations, such axial spacing being substantially less than the axial spacing of the bladder clamps during cure and cooling. Accordingly, there may only be a small space between relatively closely spaced positions of the bladder clamps for accommodating any spray or nozzle device and typically such space is substantially displaced from the upper portion of the bladder chamber when the bladder is fully inflated into the tire carcass and the press is closed. It, therefore, would be desirable to have a fluid media spray or nozzle device which can allow for bladder manipulation such as in the foregoing manner and yet provide for introduction of fluid media into the upper portion of the bladder chamber during tire cure and cooling.

SUMMARY OF THE INVENTION

A pop-up, rotating nozzle in a tire curing press, according to the present invention, provides for dispersed and uniform introduction of fluid media into the upper portion of the bladder chamber or tire cavity during tire cure and/or cooling, and yet allows for relatively close spacing of upper and lower clamps of the press center mechanism, such as during bladder insertion and stripping operations. Briefly, the nozzle has an outlet end or head in communication with the interior of the bladder or tire cavity and a supply stem mounted in the lower clamp and porting assembly of the press for both axial and rotational movement. A spring and/or fluid pressure forces urge the nozzle from a lowermost retracted position accommodating desired bladder clamp manipulation to an elevated dispensing position locating the outlet head in the upper portion of the bladder chamber for more uniform circulation of fluid media, the fluid media drain desirably being located at the bottom of the bladder chamber or tire cavity. More particularly, the nozzle is movable against the spring biasing force by the upper clamp to such lowermost retracted position which allows the upper and lower clamps to be spaced apart a distance substantially less than their spacing during cure. As the clamps move apart to their respective positions for cure, the spring urges the nozzle to such elevated dispensing position thereof in close adjacency to the upper bladder clamp.

The outlet head of the nozzle, preferably even in the lowermost retracted position thereof, is located or locatable above any possible volume of cold fluid media that may collect in the bottom of the bladder chamber for resultant energy savings and efficiency. Moreover, the outlet head is provided with a plurality of tangentially arranged outlets or jets such that the nozzle will rotate causing a uniform and dispersed flow of fluid media throughout the bladder chamber or tire cavity. The outlet head may also serve to locate the upper and lower clamps with respect to one another when engaged therebetween.

On the other hand, cold fluid media may be introduced through the bottom (drain) port during tire cool down with the elevated nozzle then used as a drain. This will serve to drive out of the bladder any vapors and gases to allow for more uniform cooling of the tire.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In the annexed drawings:

FIG. 3 is a fragmented axial section through another form of fluid media spray assembly employing a pop-up, rotating nozzle according to the invention;

FIGS. 5A and 5B are fragmented axial sections through the assembly of FIG. 4 illustrating the nozzle fully retracted and fully extended, respectively.

DETAILED DESCRIPTION

Figure 1:
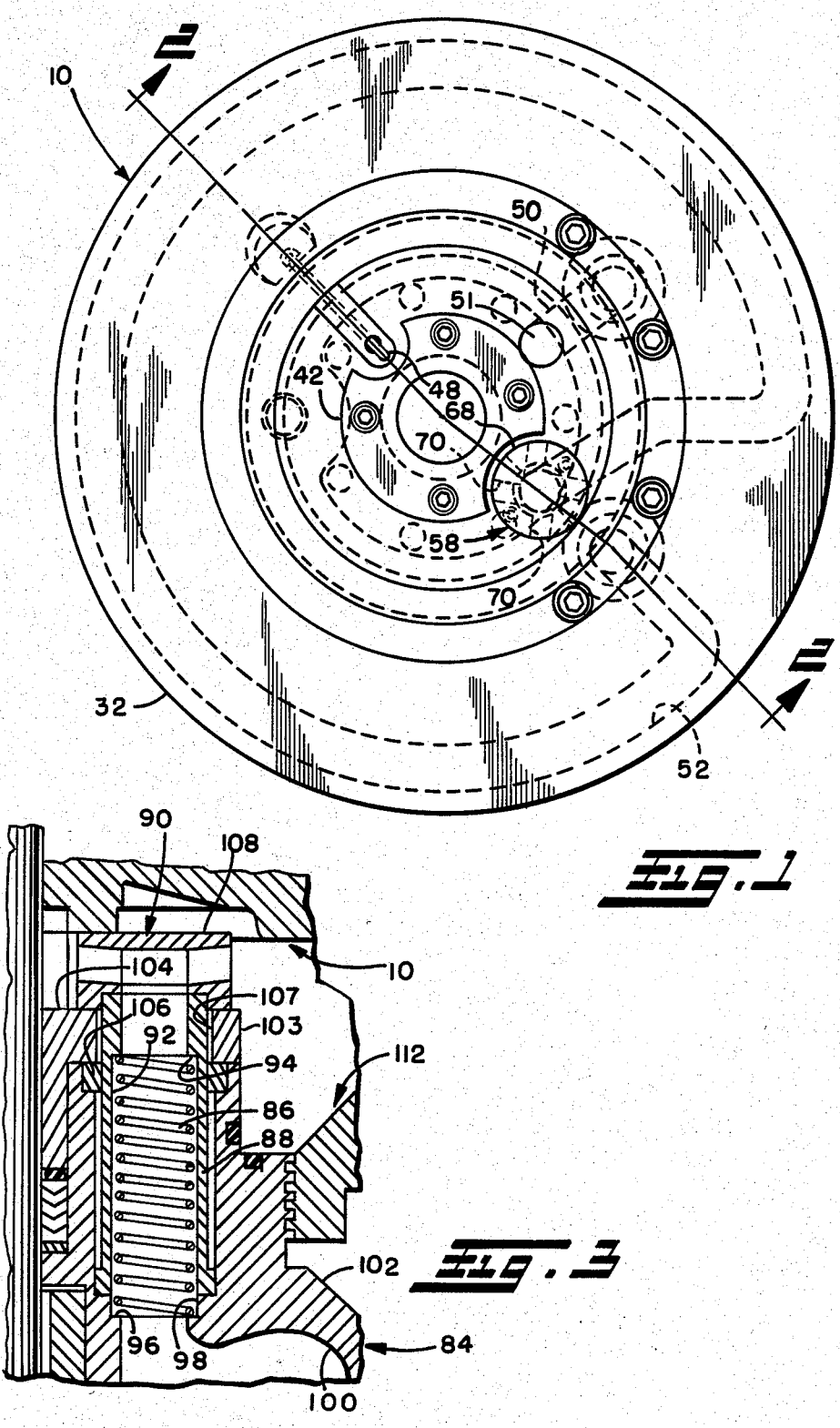
FIG. 1 is a top plan view of a fluid media spray assembly employing a pop-up, rotating nozzle according to the invention.
Figure 2:
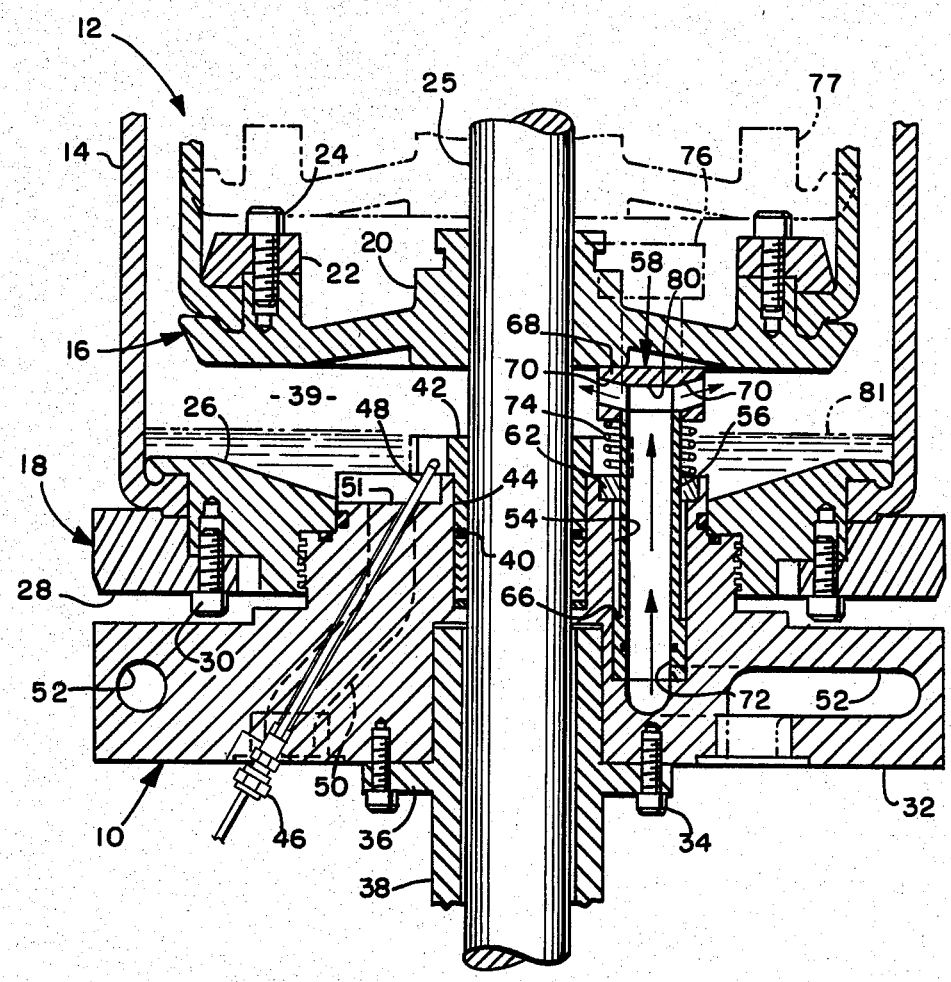
FIG. 2 is an axial section through the assembly of FIG. 1 as employed in conjunction with the upper and lower bladder clamps of a tire curing press center mechanism.

Referring now in detail to the drawings and initially to FIGS. 1 and 2, a fluid media spray assembly employing a pop-up, rotating nozzle according to the invention is designated generally by reference numeral 10. The spray assembly 10 is intended for use in combination with a tire curing press and, in particular, with a press employing an upstanding bladder center mechanism. Only the pertinent components of the tire curing press are shown in FIG. 2 where it can be seen that the spray assembly 10 forms a component part of the press center mechanism indicated at 12.

The center mechanism 12 includes an inflatable bladder 14 having upper and lower beads clamped by upper and lower bladder clamps 16 and 18, respectively. The upper bladder clamp 16 engages the upper bead area of the bladder 14 between a lower clamp plate 20 and a cooperating upper clamp ring 22 which are detachably secured together by fasteners 24 for bladder change. The lower clamp plate 20 has a central hub portion mounted to the upper end of a center post 25 which may be mounted and actuated for vertical (axial) movement in the bottom half of the press as is known.

The lower bladder clamp 18, on the other hand, engages the lower bead area of the bladder 14 between an upper clamp ring 26 and a cooperating lower clamp ring 28 which are detachably secured together by fasteners 30 for bladder change. The upper clamp ring 26 is threaded on and sealed to a reduced diameter upper portion of a porting hub 32 which thus constitutes a part of the lower bladder clamp as well as the aforementioned spray assembly 10. The porting hub 32 in turn is secured at its bottom end by fasteners 34 to a ring flange 36 provided on a center post sleeve 38. The center post sleeve 38 may be fixedly mounted in the bottom half of the press or may be mounted for vertical (axial) movement independently of the center post 24 as is known. In the latter case the upper and lower bladder clamps 16 and 18 would then both be movable vertically and relative to one another for bladder manipulation such as in the manner described in applicant's assignee's U.S. Pat. No. 4,338,069, issued July 6, 1982 and entitled "Tire Press". In order to provide a completely sealed interior chamber 39 for fluid media within the center mechanism 12 and yet allow for such relative vertical movement of the bladder clamps, the porting hub 32 is sealed to the center post 25 passing therethrough by suitable packing 40 retained by a retainer ring 42 in a counterbore 44 in the porting hub. The porting hub also may have secured thereto and extending therethrough a temperature probe 46, the sensing end of which extends into the lower portion of the chamber 39 as seen at 48.

Referring now in particular to the spray assembly 10, the porting hub 32 has fluid passage providing for introduction and draining of fluid media to and from the interior chamber 39 defined by the bladder 14, the upper and lower bladder clamps 16 and 18, and the porting hub 32. The passage indicated at 50 opens at 51 to the top surface of the porting hub, interiorly of the bladder, and serves as a drain. Such drain passage 50 may be serviced by a drainpipe set in the lower end thereof at the underside of the porting hub.

For fluid media introduction to the chamber 39, there is provided an inlet passage 52 which, for the most part, extends annularly through the larger diameter lower portion of the porting hub 32. At its fluid entry end, the inlet passage extends radially inwardly from the annularly extending portion thereof and then downwardly for service connection to a fluid supply pipe at the underside of the porting hub. At the other end of the annular portion, the inlet passage extends generally radially inwardly to the lower end of a vertical (axial) riser 54.

The riser 54 is cylindrical and has a supply stem 56 of a pop-up, rotating nozzle 58 retained therein for telescoping vertical (axial) movement. The nozzle stem 56 is guided for such vertical movement by a larger diameter lower end portion thereof which is closely fitted for vertical and rotational sliding movement in the riser 54 and by a retaining ring 62 in which a smaller diameter upper portion of the stem is closely fitted for vertical and rotational sliding movement. As seen in FIG. 2, the retaining ring 62 is press fitted or otherwise secured in a counterbore flush with the top surface of the porting hub 32. It will be appreciated that the retaining ring also serves as a stop which prevents the nozzle stem 56 from being completely telescoped out of the riser 54 by engagement with the shoulder 66 formed at the intersection of the larger and smaller diameter portions of the stem.

The upper end of the nozzle supply stem 56 extends above the top surface of the porting hub 32, even when bottomed out in the riser 54, and has a nozzle or fluid media outlet head 68 provided at the top thereof. The outlet head 68 includes a plurality of fluid media outlets or jets 70 which open to the interior of the bladder 14 for passage therethrough of fluid media received from an axial supply passage 72 in the supply stem 56 which in turn receives fluid media from the inlet passage 52 in the porting hub 32. As seen in FIG. 1, there are four such outlets or jets 70 which are tangentially arranged with respect to the vertical or rotational axis of the nozzle 58. That is, the outlets 70 extend tangentially to an imaginary circle concentric with the nozzle axis. In addition, the outlets preferably are slightly angled upwardly to a horizontal plane in which they commonly reside, as seen in FIG. 2.

As also seen in FIG. 2, a coil spring 74 is interposed between the underside of the nozzle outlet head 68 which projects radially beyond the nozzle stem 56 and the top surface of the retaining ring 62. The spring accordingly serves to urge the nozzle 58 from a lowermost retracted position thereof seen in solid lines in FIG. 2 towards an elevated dispensing position thereof seen in phantom lines in FIG. 2 at 76. The nozzle however will retract against the spring biasing force exerted thereon when the upper and lower bladder clamps 16 and 18 move to their closely spaced positional relationship seen in solid lines in FIG. 2. That is, the upper bladder clamp will engage the outlet head 68 of the nozzle as the bladder clamps move together and cause the nozzle supply stem to retract or telescope into the porting hub 32. On the other hand, as the bladder clamps move apart, the spring will cause the nozzle to move along with the upper bladder clamp until the shoulder 66 thereon abuts the retaining ring 62 and prevents further telescopic extension of the nozzle out of the porting hub 32. Preferably, the nozzle outlet head 68 when in such uppermost position thereof (76) will be spaced slightly below the upper bladder clamp when the upper and lower bladder clamps are in their respective cure positions to prevent any frictional interference to the hereinafter described rotational movement of the nozzle during fluid dispensing. In FIG. 2, the lower bladder clamp is shown in such cure position thereof whereas the relative cure position of the upper bladder clamp is shown in phantom lines at 77.

In operation, the bladder 14 may be manipulated in various manners during the sequential steps of each press cycle by relatively raising and lowering the bladder clamps 16 and 18. As in the manner disclosed in the aforementioned U.S. Pat. No. 4,338,069, the bladder clamps may be brought into relatively closely vertically spaced relationship such as for initial insertion of the bladder into an uncured tire carcass, such vertical spacing being substantially less than the vertical spacing of the bladder clamps when in their respective cure positions. As aforementioned, manipulation of the bladder in this manner is accommodated since the nozzle 58 can retract into the porting hub 32.

At this point, hot fluid or curing media such as steam may be supplied under pressure to the nozzle 58 through the inlet passage 52. The fluid media will be channeled through the supply passage 72 in the nozzle supply stem 56 for passage into the chamber 39 via the nozzle head outlets 70. The fluid media exiting the nozzle head outlets will be tangentially directed outwardly with respect to the rotational axis of the nozzle whereby a reactionary rotational moment will be imparted to the nozzle. When the initial shaping pressure is sufficient to overcome any then existing frictional interference between the nozzle outlet head and upper bladder clamp 16, the nozzle will rotate and provide for uniform and dispersed flow of fluid media within the interior of the bladder.

As the bladder 14 is inflated into the tire carcass, the bladder clamps 16 and 18 may then move away from each other and finally to their respective cure positions. As the bladder clamps move apart, the nozzle 58 will be urged by the spring 74 and by fluid forces then acting against the inside top wall 80 of the outlet head to its uppermost dispensing position seen in phantom lines at 76 in FIG. 2 which is in close adjacency to the upper bladder clamp. As indicated above, the outlet head 68 of the nozzle will, however, be slightly spaced from the upper bladder clamp 16 when the bladder clamps are in their respective cure positions, this providing for freewheeling rapid rotation of the nozzle about its rotational axis due to the rotational moment imparted thereto by fluid media exiting through the tangentially arranged nozzle head outlets 70.

The outlet head 68 of the nozzle 58, in addition, will now be located in and dispense fluid media into the upper portion of the bladder chamber 39. In addition, the outlets 70, being slightly angled upwardly to a horizontal plane as indicated, will further direct the fluid media upwardly into the uppermost portion of the bladder chamber 30. This provides for better and more efficient circulation of the fluid media in the chamber, the drain 51 being located at the bottom of the chamber. Also, the nozzle will rapidly rotate as aforementioned and thus provide for dispersed and uniform circulation of the fluid media within the bladder chamber during cure.

After the requisite time period necessary to achieve vulcanization of the tire, a cold fluid media such as water may then be circulated through the interior of the bladder 14 to prevent overcure of the tire and to ready the tire for post-cure operations such as post-cure inflation. In particular, the cold fluid media may be introduced through the bottom (drain) port 51 with the elevated nozzle then used as a drain. After cooling, the supply of cold fluid media is shut off and fluid media within the chamber 39 is drained therefrom.

It is possible however that a quantity of cold fluid media may remain and collect in the lower portion of the bladder chamber 39, such possible volume being indicated at 81 in FIG. 2. Moreover, at the start of the next cure operation, a quantity of relatively cold fluid media may be purged from the supply passage 52 and nozzle 58 and added to any cold fluid media collected in the bottom of the chamber.

With reference to FIG. 2, it will be appreciated that the nozzle outlet head 68, even in its lowermost retracted position, preferably is located above such potential volume 81 of cold fluid media. Accordingly, hot curing media introduced into the interior of the bladder through the nozzle will not be subjected to bubbling through such collected cold media which results in substantial energy savings. Of course, the nozzle outlet head in its uppermost position will be well above the potential volume 81 of cold fluid media.

Referring now to FIG. 3, another form of spray assembly is designated generally by reference numeral 84. The assembly 84 is similar in construction and operation to that described above except that the spring 86 thereof is disposed interiorly of the supply stem 88 of the pop-up, rotating nozzle 90. As shown, the supply passage 92 of the stem 88 has a larger diameter lower portion accommodating the spring. One end of the spring acts against the shoulder 94 formed at the intersection of such larger diameter portion and the smaller diameter upper portion of the supply passage whereas the other end of the spring extends into and acts against the bottom wall 96 of a counterbore 98 provided at the outlet end of the inlet passage 100 in the porting hub 102. It also will be seen that the top flange 103 of the packing retaining ring 104 extends radially over the nozzle guide and retaining ring 106 and is butted against the top surface of the porting hub 102. As shown, the stem of the nozzle extends through an axial bore 107 in such flange 103 whereas the nozzle outlet head 108 has a diameter greater than that of the bore 107 so that it may be butted against the top surface of the flange 103.

With this form of spray assembly 84, the nozzle outlet head 108 can be fully retracted and butted, as shown, against the packing retaining ring 104 which in turn is butted against the porting hub 102. Accordingly, the nozzle outlet head will serve to locate the upper and lower bladder clamps 110 and 112 with respect to one another when the clamp assemblies are axially moved towards each other and the nozzle head engaged therebetween as shown. This may be advantageous, for example, in connection with the locating of the bladder in relation to a tire carcass loaded in the press such as in the manner described in the aforementioned U.S. Pat. No. 4,338,069.

Figure 4:
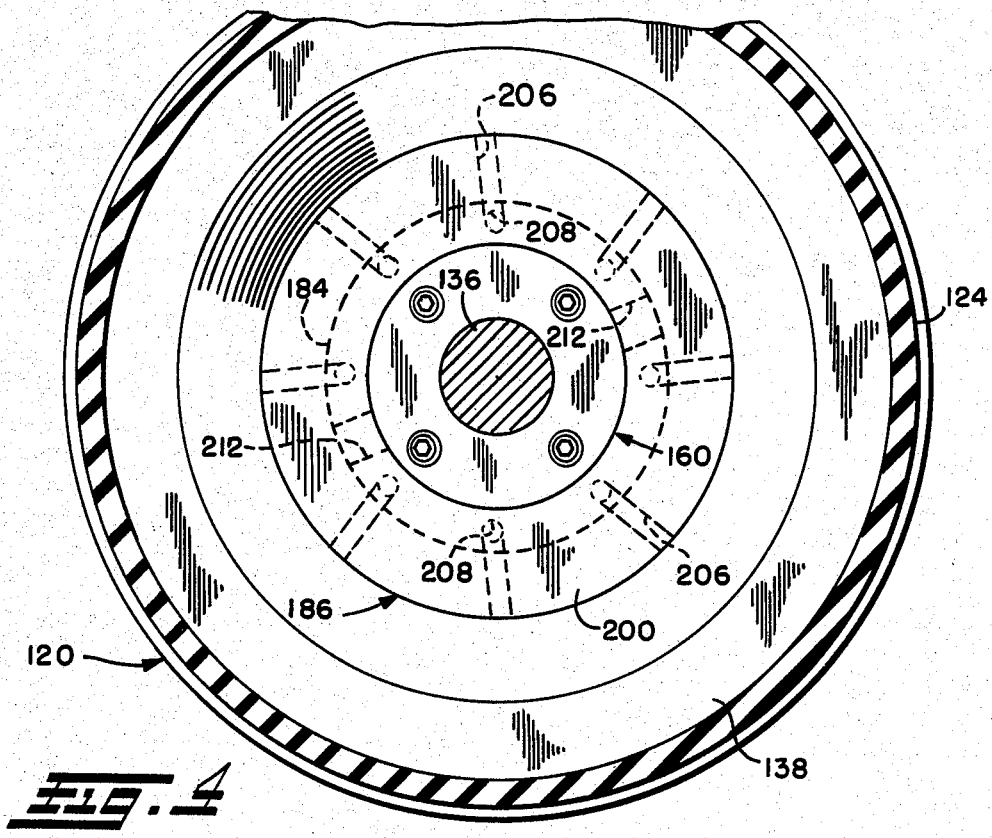
FIG. 4 is a top plan view of still another form of fluid media spray assembly employing a pop-up, rotating nozzle according to the invention.
Figure 6:
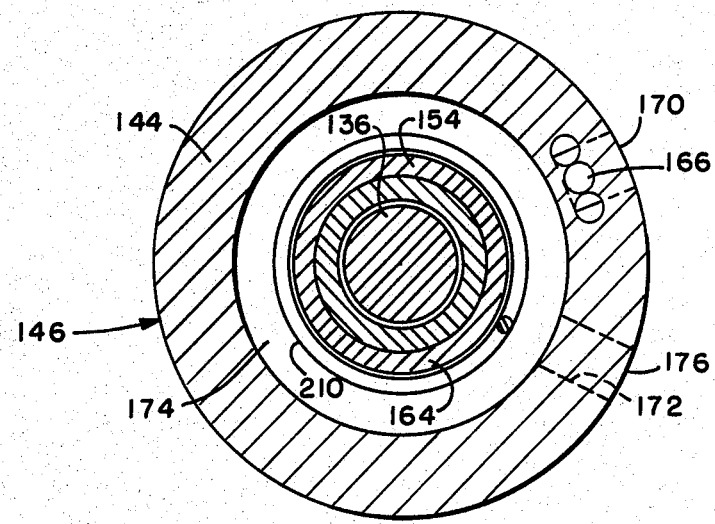
FIG. 6 is a horizontal section through the assembly taken along the line 6—6 of FIGS. 5A and 5B.

In FIGS. 4–6, still another form of fluid media spray assembly employing a pop-up, rotating nozzle according to the invention is designated generally by reference numeral 120. Like the spray assembly 10 of FIGS. 1 and 2, the spray assembly 120 is intended for use in combination with a tire curing press and, in particular, with a press employing an upstanding bladder center mechanism. Only the pertinent components of the tire curing press are shown in FIGS. 5A and 5B where it can be seen that the spray assembly 120 forms a component part of the press center mechanism indicated at 122.

The center mechanism 122 includes an inflatable bladder 124 having upper and lower beads clamped by upper and lower bladder clamps 126 and 128, respectively. The upper bladder clamp 126 engages the upper bead area of the bladder 124 between a lower clamp plate 130 and a cooperating upper clamp ring 132 which are detachably secured together by fasteners 134 for bladder change. The lower clamp plate 130 has a central hub portion mounted to the upper end of a center post 136 which may be mounted and actuated for vertical (axial) movement in the bottom half of the press as is known.

The lower bladder clamp 128, on the other hand, engages the lower bead area of the bladder 124 between an upper clamp ring 138 and a cooperating lower clamp ring 140 which are detachably secured together by fasteners 142 for bladder change. The upper clamp ring 138 is threaded on and sealed to an outer annular wall 144 of a porting hub 144 which thus constitutes a part of the lower bladder clamp as well as the aforementioned spray assembly 120. The pouring hub 146 in turn is secured at its annular bottom end wall 148 by fasteners 150 to a ring flange 152 provided on a center post sleeve 154. The center post sleeve 54 may be fixedly mounted in the bottom half of the press or may be mounted for vertical (axial) movement independently of the center post 136 as is known. In the latter case, the upper and lower bladder clamps 126 and 128 would then both be movable vertically and relative to one another for bladder manipulation such as in the manner described in the aforementioned U.S. Pat. No. 4,338,069. In order to provide a completely sealed interior chamber 156 for fluid media within the center mechanism 122 and yet allow for such relative vertical movement of the bladder clamps, the porting hub 146 is sealed to the center post 136 passing therethrough by suitable packing 158 retained by a retainer ring 160 in a counterbore 162 concentrically provided in an inner annular wall 164 of the porting hub.

Referring now in particular to the spray assembly 120, the porting hub 146 has fluid passages providing for introduction and draining of fluid media to and from the interior chamber 156 defined by the bladder 124, the upper and lower bladder clamps 126 and 128, and the porting hub. The outer annular wall 144 of the porting hub has a suitably located axial passage 166 which opens at 168 to the bottom of the interior chamber 156. Such passage 166 serves as a drain and extends radially outwardly at its lower end for service connection to a drainpipe (not shown) at 170.

For fluid media introduction to the chamber 156, there is provided an inlet passage 172 which extends radially through the outer annular wall 144 of the porting hub 146 and to the lower end of a vertically (axially) oriented annular riser 174. As best seen in FIG. 6, the inlet passage 172 is circumferentially spaced from the drain passage 166 for service connection to a fluid supply pipe (not shown) at its fluid entry end 176.

As seen in FIGS. 5 and 6, the outer annular wall 144 and inner annular wall 164 of the porting hub 146 respectively have radially inner and outer surfaces 178 and 180 which are radially spaced apart to define therebetween the annular riser 174 which is closed at its bottom end by the annular top surface 182 of the porting hub bottom wall 148. The surfaces 178 and 180 are concentric to the center axis of the center mechanism 122 for like disposition of the annular riser 174 in the center mechanism.

The annular riser 174 has retained therein an annular supply stem 184 of a pop-up, rotating nozzle 186 for telescoping vertical (axial) movement between its fully retracted position seen in FIG. 5A and its fully extended position seen in FIG. 5B. The annular stem 184 has a radially outer cylindrical surface 188 which is closely fitted to the radially inner cylindrical surface 178 of the outer annular wall 144 for vertical and rotational sliding movement. The annular stem also has radially stepped, upper and lower cylindrical surfaces 190 and 192. The lower or reduced diameter surface 192 is closely fitted to the radially outer cylindrical surface 180 of the inner annular wall 164 for vertical and rotational sliding movement. On the other hand, the upper or larger diameter surface 190 is closely fitted to the radially outer cylindrical surface 194 of an annular top flange 196 of the retainer ring 160, which top flange 196 is butted against the top surface of the inner annular wall and projects radially outwardly beyond the cylindrical outer surface 180 of the inner annular wall. Accordingly, the nozzle stem is guided for vertical movement while the top flange 196 of the retainer ring serves as an abutment stop which prevents the nozzle stem from being completely telescoped out of the riser 174 by engagement with the shoulder 198 formed at the intersection of the stepped inner surfaces 190 and 192 of the stem 184.

The nozzle 186 further includes an annular nozzle or fluid media outlet head 200 provided at the top of the supply stem 184. The annular nozzle outlet head 200 has a diameter greater than that of the stem 184 so that it may be butted against the top surface of the outer annular wall 144 when fully retracted as seen in FIG. 5A. Also, the outlet head may have a vertical (axial) thickness corresponding to that of the top flange 196 of the retainer ring 160. Accordingly, the nozzle outlet head can be fully retracted and butted, as seen in FIG. 5A, atop the outer annular wall 144 to provide, along with the retainer ring 160, a rigidly backed surface against which the lower bladder clamp 128 may be butted upon axial downward movement thereof.

With particular reference to FIGS. 4 and 5, the nozzle outlet head 200 can be seen to include a plurality of fluid media outlets or jets 206 which open to the interior of the bladder 124 for passage therethrough of fluid media received from respective axial supply passages 208 in the supply stem 184 which in turn receive fluid media from the lower portion of the riser 174 connected to the inlet passage 172 in the porting hub. As seen in FIG. 4, there are multiple such outlets or jets 206 which are tangentially arranged with respect to the vertical or rotational axis of the nozzle 186. That is, the outlets extend tangentially to an imaginary circle concentric with the nozzle axis.

As also shown, a coil spring 210 is disposed about the annular inner wall 164 of the porting hub and between the underside of the nozzle supply stem 184 and the top surface 182 of the annular bottom wall 148 of the porting hub 146. The spring 210 accordingly serves to urge the nozzle 186 from the lowermost retracted position thereof seen in FIG. 5A towards the elevated dispensing position thereof seen in FIG. 5B. The nozzle however will retract against the spring biasing force exerted thereon when the upper and lower bladder clamps 126 and 128 move to their closely spaced positional relationship seen in FIG. 5A. That is, the upper bladder clamp 126 will engage the outlet head 200 of the nozzle as the bladder clamps move together and cause the nozzle supply stem 184 to retract or telescope into the porting hub. On the other hand, as the bladder clamps move apart, the spring 210 will cause the nozzle to move along with the upper bladder clamp until the shoulder 198 thereon abuts the top flange 196 of the retainer ring 160 and prevents further telescopic extension of the nozzle out of the porting hub. As will be appreciated, the length of the nozzle stem 184 may be chosen to provide for desired positioning of the nozzle outlet head 198 when the nozzle is in its fully extended position. The annular nozzle stem 184 also may be provided with one or more circumferentially spaced slots 212 which allow any captured fluid media to drain from the interior of such stem. As seen in FIG. 5B, the bottom of each slot 212 is no higher than the top of the retainer ring 160 when the nozzle stem is fully elevated so that no fluid media will be trapped interior of the stem.

In operation, the pop-up, rotating nozzle 186 will function in a manner similar to that described with respect to the nozzle embodiment of FIGS. 1 and 2. It is noted, however, that fluid media will be even more uniformly dispersed by reason of the nozzle being positioned concentrically within the center mechanism. That is, the concentric nozzle concentrically disperses flow of fluid media within the interior of the bladder. Moreover, the concentric nozzle provides a relatively large and concentrically arranged abutment for top bladder clamp locating purposes.

Although the invention has been shown and described with respect to a preferred embodiment, it is obvious that equivalent alterations and modifications will occur to others skilled in the art upon the reading and understanding of the specification. For example, the principles of the invention may have application in bladderless-type presses which employ axially movable tire bead clamps in the center mechanism thereof. Also, the nozzle head may be provided with radial fluid outlets and rotated by means other than fluid passing therethrough. The present invention includes all such equivalent alterations and modifications, and is limited only by the scope of the following claims.

We claim:

1. In a tire curing press, a center mechanism operative to define a fluid chamber in which heat transfer fluid media is circulated to shape and cure an uncured tire carcass in the press, nozzle means for introducing such fluid media into said chamber, and means for mounting said nozzle means in said center mechanism for movement between relatively retracted and extended positions in said chamber, said means for mounting including a porting member in said center mechanism, and said nozzle means being mounted in said porting member for extension and retraction.

2. A tire press as set forth in claim 1, wherein means are provided for resiliently urging said nozzle means to such relatively extended position thereof.

3. A tire press as set forth in claim 1, wherein said chamber, during cure, has a horizontal center plane coincident with that of the tire carcass, and said nozzle is mounted for vertical movement between such relatively retracted and extended positions thereof, said nozzle means having an upper fluid media outlet end locatable in the upper center portion of said chamber upon movement of said nozzle means to such extended position thereof for cure.

4. A tire press as set forth in claim 3, comprising drain means for such fluid media opening to the lower center portion of said chamber.

5. A tire press as set forth in claim 1, wherein said chamber, during cure, has a center plane coincident with that of the tire carcass, and said nozzle means is movable axially at a right angle to such center plane, said nozzle means including fluid media outlet means operative to direct fluid media exiting therefrom into said chamber circumferentially with respect to the movement axis of said nozzle means.

6. A tire press as set forth in claim 5, wherein said nozzle means also is mounted in said center mechanism for rotation about such movement axis and means are provided to rotate said nozzle means.

7. A tire press as set forth in claim 5, wherein said means to rotate includes a plurality of tangentially arranged fluid media outlets in said nozzle means whereby fluid media tangentially exiting from said nozzle means through said outlets will cause said nozzle means to rotate for effecting dispersed and uniform flow of fluid media within the interior of said chamber.

8. A tire press as set forth in claim 1, wherein said porting member includes a fluid media inlet passage terminating at a riser, and said nozzle means includes a supply stem retained in said riser for telescopic movement.

9. A tire press as set forth in claim 8, wherein said supply stem is rotatable in said riser, and said nozzle means further includes fluid media outlet means connected to said supply stem operative to direct fluid exiting therefrom into said chamber tangentially with respect to the rotational axis of said supply stem whereby said nozzle means will be caused to rotate.

10. A tire press as set forth in claim 1, wherein said nozzle means is concentrically mounted in said center mechanism.

11. A tire press as set forth in claim 10, wherein said riser and supply stem are both amnular and concentrically disposed in said center mechanism.

12. A tire press as set forth in claim 1, wherein said supply stem is rotatable in said riser, and said nozzle means further includes annular fluid media outlet means concentrically connected to said supply stem operative to direct fluid exiting therefrom into said chamber tangentially with respect to the rotational axis of said supply stem whereby said nozzle means will be caused to rotate.

13. In a tire curing press, a center mechanism operative to define a fluid chamber in which heat transfer fluid media is circulated to shape and cure an uncured tire carcass in the press, nozzle means for introducing such fluid media into said chamber, and means for mounting said nozzle means in said center mechanism for movement between relatively retracted and extended positions in said chamber, said center mechanism including a shaping and curing bladder and upper and lower clamps therefor which are relatively vertically movable to a relatively close vertical spacing less than their vertical spacing for cure, and said nozzle means being mounted in said lower bladder clamp for vertical movement from such retracted position accommodating such relatively close vertical spacing of said bladder clamps to such extended position upon vertical separation of said bladder clamps to their respective positions for cure.

14. A tire press as set forth in claim 13, wherein said nozzle means includes a fluid outlet head interposed between said bladder clamps, said fluid outlet head being locatable adjacent said lower bladder clamp upon movement of said nozzle means to such retracted position thereof and remote from said lower bladder clamp upon movement of said nozzle means to such extended position thereof.

15. A tire press as set forth in claim 14, wherein said fluid outlet head is engageable between said upper and lower bladder clamps thereby precisely to locate said bladder clamps with respect to one another.

16. A tire press as set forth in claim 13, wherein means are provided to resiliently urge said nozzle means to such extended position thereof, and said nozzle means is engageable with and movable by said upper blader clamp to such retracted position thereof against such means to resiliently urge upon relative vertical movement of said bladder clamps to such relatively close vertical spacing thereof.

17. In a tire curing press, nozzle means for introducing heat transfer fluid media into the cavity of a tire for shaping and cure of the tire in the press, and means for rotating said nozzle means to effect uniform and dispersed flow of fluid media within such cavity.

18. A tire press as set forth in claim 17, wherein the rotational axis of said nozzle means is normal to the transaxial center plane of the tire.

19. A tire press as set forth in claim 18, wherein said nozzle means includes a plurality of fluid outlets extending generally in a plane normal to the rotational axis of said nozzle means.

20. A tire press as set forth in claim 19, wherein said fluid outlets are angled in relation to such plane.

21. A tire press as set forth in claim 17, wherein the rotational axis of said nozzle and the axis of the tire are coaxial.

22. A tire press as set forth in claim 17, wherein said nozzle means is mounted for rotation in a center mechanism operative to define a fluid chamber in which such heat transfer fluid media may be circulated under pressure to shape and cure the tire in the press, and said nozzle means includes fluid media outlet means operative to direct fluid media exiting therefrom into said chamber tangentially with respect to the rotational axis of said nozzle means whereby said nozzle means will rotate causing uniform and dispersed flow of fluid media within the interior of said chamber.

23. A press as set forth in claim 22, wherein said outlet means includes at least one fluid media outlet tangentially arranged with respect to the rotational axis of said nozzle means.

24. A press as set forth in claim 22, wherein said chamber during shaping and cure has an axis coincident with the axis of the tire carcass, and such axis and rotational axis of said nozzle means are parallel.

25. A press as set forth in claim 24, wherein such axis of said chamber and rotational axis of said nozzle means are radially offset.

26. A press as set forth in claim 22, wherein said nozzle means includes an axially extending supply stem, and said center mechanism includes a porting member, said porting member having a fluid media inlet passage terminating at an axial riser, and said supply stem being retained in said axial riser for rotational movement.

27. A press as set forth in claim 26, wherein said supply stem is additionally retained in said axial riser for telescopic axial movement.

28. A tire press as set forth in claim 26, further comprising means to position said nozzle means in the uppermost center region of such cavity when the tire is in its final toroidal shape.

29. A press as set forth in claim 28, wherein said nozzle means includes a plurality of fluid media outlets angled upwardly in relation to the transaxial center plane of the tire.

30. A press as set forth in claim 29, wherein said fluid media outlets are arranged circumferentially with respect to the axis of such cavity.

31. A press as set forth in claim 28, wherein said nozzle means includes a plurality of fluid media outlets arranged circumferentially with respect to the rotational axis of said nozzle means.

32. A press as set forth in claim 28, comprising a center mechanism operative to define in the tire cavity a fluid chamber in which such heat transfer fluid media is circulated, and means for mounting said nozzle means in said center mechanism for movement relative to said center mechanism between upper and lower positions in said chamber.

33. A press as set forth in claim 32, wherein said means to position includes means for resiliently urging said nozzle means to such upper position in said chamber.

34. A press as set forth in claim 28, comprising drain means for said fluid media opening to the lowermost center region of such cavity when the tire is in such final toroidal shape.

35. In a tire curing press including a center mechanism operative to define a fluid chamber in which heat transfer fluid media is circulated under pressure to shape and cure an uncured tire carcass; nozzle means for directing such fluid media into said chamber, and means for mounting said nozzle means in said center mechanism for both axial and rotational movement.

* * * * *